UNITED STATES PATENT OFFICE 2,229,610

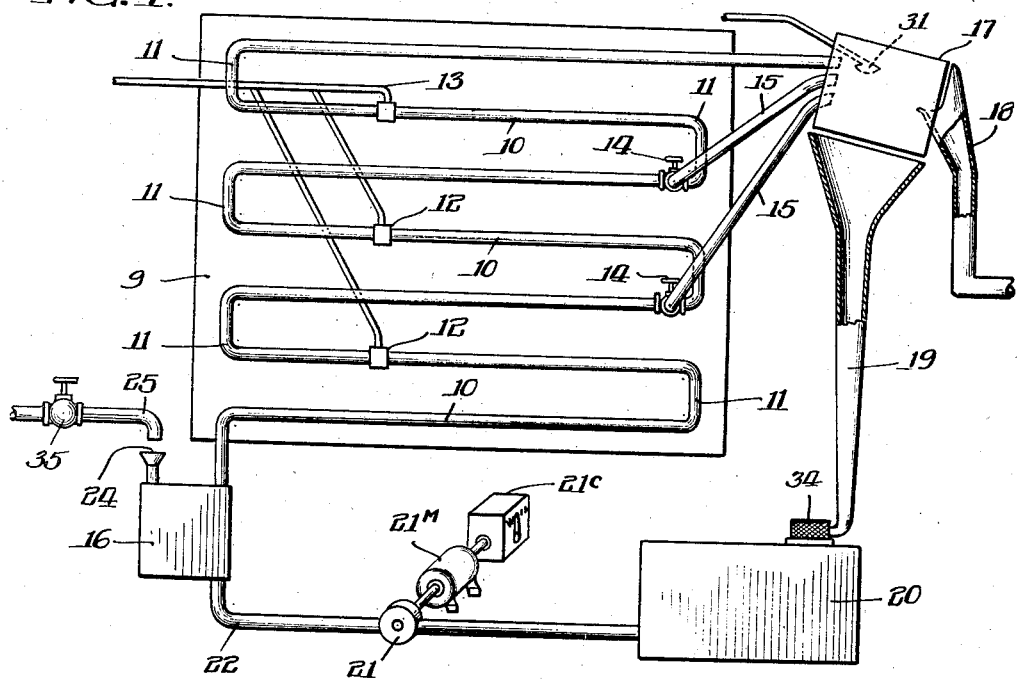

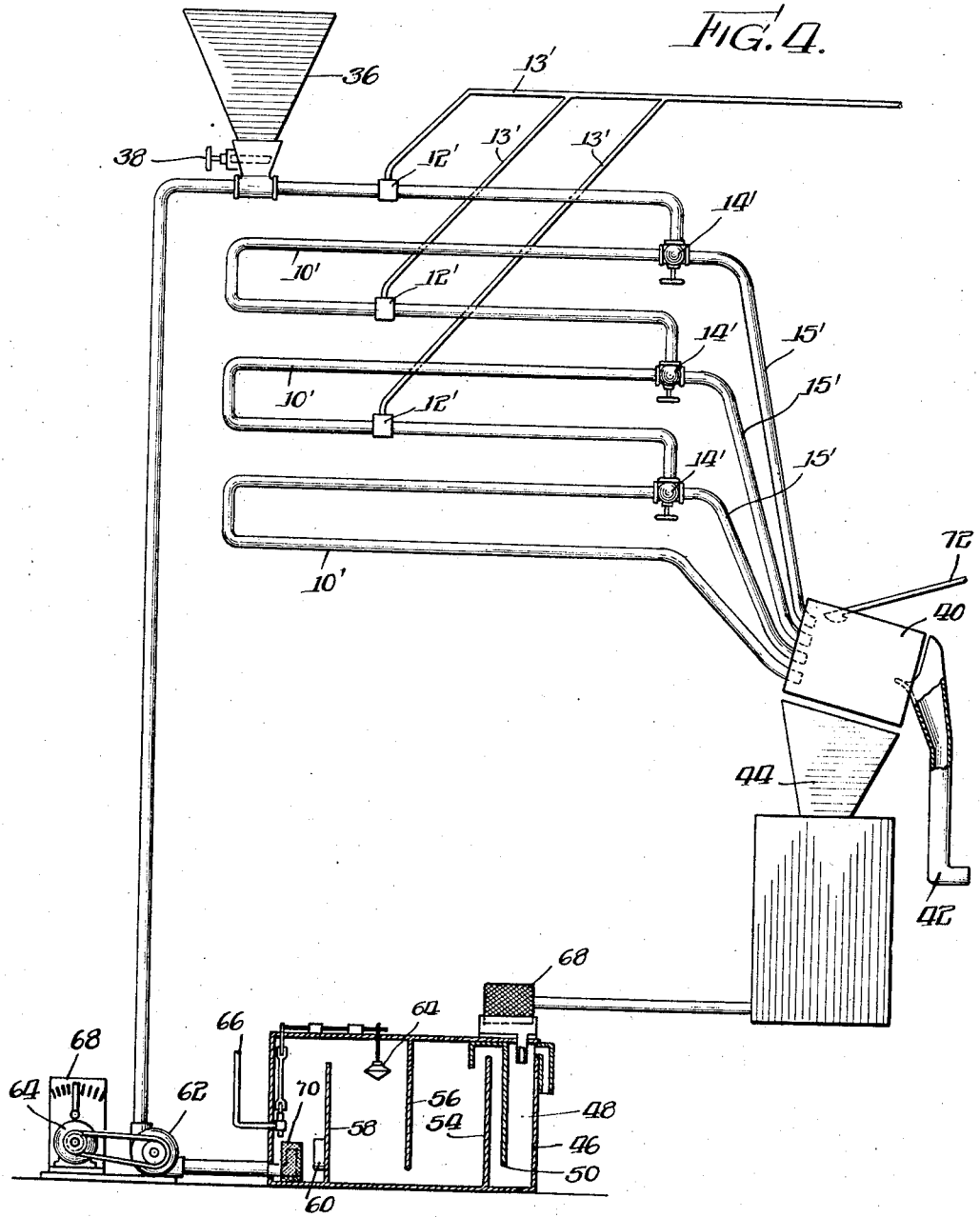

APPARATUS FOR HEAT TREATING VEGETABLES PRIOR TO CANNING

Winford E. Nicholoy, Columbus, Ohio, assignor to Scott-Viner Company, Columbus, Ohio, a corporation of Ohio Application October 23, 1936, Serial No. 107,269

10 Claims. (Cl. 53—18)

The present application relates to an apparatus for heat treating vegetables such as peas, beans, corn, and the like. The present application is a continuation in part of my prior application Serial Number 743,241, filed September 8, 1934.

The present invention provides a new apparatus for heat treating vegetables of the type hereinbefore described whereby such vegetables are effectively cleansed, the foreign odors and tastes being removed therefrom in the most efficient and expeditious manner. The invention also has numerous other advantages, some of which include the provision of a heating and cleansing apparatus in which the materials under treatment at all times are completely surrounded by or bathed in hot water; a food heating and treating apparatus having a relatively slight temperature drop during its operation; a food heating and cleansing apparatus which reduces the time required for the treatment of the materials and preserves the color and flavor; a food heating and cleansing apparatus in which the quantity of food material and the quantity of hot water used therewith bear a fixed relation; a food heating and cleansing apparatus in which accurate control of the temperature of the water is had; a food heating and cleansing apparatus in which the hot water is reconditioned after operation; a food heating and cleansing apparatus in which a higher temperature may be maintained for the water without detriment to the processing of the food; a food heating and cleansing apparatus in which the food materials are scrubbed; a food heating and cleansing apparatus of extreme simplicity; a food heating and cleansing apparatus providing an improved hydraulic conveying and heat treating system whereby food commodities such as peas and beans may be treated for variable periods of time depending upon their specific characteristics without impairing the value of the commodity; and apparatus for treating and cleansing food commodities in which means is provided for injecting steam directly into contact with the commodity and the water carrying the commodity whereby to heat the water and also the commodity to carry out the processing operation; an apparatus for cleansing and treating food in the form of relatively small sizes which will process the food most effectively with a minimum waste of liquid which will impart a uniform heat treatment and wherein the degree or extent of treatment may be quickly and easily varied.

These and other objects of the invention will be apparent from a perusal of the following specification when taken in connection with the accompanying drawings, in which:

Figure 1 is an elevation of a somewhat schematic installation of an apparatus for treating food products as hereinafter described;

Figure 2 is a detailed elevation of one form of separating and distributing means used in connection with the apparatus shown in Figure 1;

Figure 3 is a detail section of one form of settling means which may be used in connection with the apparatus shown in Figure 1; and Figure 4 is a view of the gravity type of apparatus.

The present invention in general relates to an apparatus adapted to replace prior apparatus for performing so-called blanching operations on vegetables and other commodities such as peas, beans, and the like prior to the canning operation. In heretofore known processes and processing apparatuses for blanching foods, including vegetables such as peas, beans, and the like, preparatory to canning, both the flavor and color of the vegetables were affected.

The present invention is not concerned with the cooking of vegetables. On the other hand it is concerned with a thorough washing of the vegetables in clean hot water accompanied by thorough pre-heating of the vegetables. Both of these operations are accomplished by the present invention in relatively short time in water heated to such a temperature that the natural color of the product and its full flavor are brought out and preserved. In addition to the cleansing and heating apparatus, the apparatus effects the removal of the gases from the vegetables. In the present apparatus the vegetables are properly processed by continuously flowing raw vegetables in hot water through a closed tube or conduit, wherein the tube or conduit forms a portion of a closed water circulation system, wherein means is provided for substantially maintaining a uniform amount of clean water in the circulating system, and wherein means is provided for maintaining the water in which and by which the vegetables flow and are conveyed through the closed tube at substantially controlled temperatures throughout the length of the tube, the temperature of the heated water, the length of the closed tube, and the time required to pass the vegetables through the tube being selected to carry out the process in substantially two minutes more or less and in a manner such that not only will cooking of the vegetable be avoided, but the main heat treating and cleansing operation will be carried out. In certain aspects of the invention herein water forming the transporting and heating means of the vegetables is forced through the piping or hollow conduit in such manner as to create a pressure. In the type of apparatus wherein the water is pumped upwardly through the closed tube, the water enters at the bottom of the apparatus and is discharged at the top, the pressure being created principally by the elevation or head, the same being the differential between the intake point and the elevated discharge point. In another embodiment of the invention where a gravity flow through the piping is utilized, this pressure is created entirely by the pipe friction and the number of turns in the piping minus whatever effect the gravity flow has to offset this.

In addition, means is provided as desired for changing at will the length of the tubular conduit so as to vary the time interval in which the commodity is heat treated while being conveyed by the body of water. In another embodiment of the invention the rate of flow of the water carrying the commodity therein while being treated may be varied to alter the degree or extent of the treatment.

A short length for the tubular members may be more desirable. Twenty feet or thereabouts is highly satisfactory. Longer lengths of tubing are useful and may be substituted for the short length. To make the desired length, the tubing is joined by connecting members such as return bends. The cross-sectional area of the bends is the same as that of the tubes and a plurality of such bends increases the pressure required to advance material through the tubes.

For heating, conveying, heat treating, and cleansing liquid, steam injectors may be used which may be operated by temperature control mechanism arranged at selected intervals along the tubular course whereby to charge the system with live steam as the water and material flow therein for the purpose of maintaining a predetermined minimum temperature and for subjecting the peas or the like to a steam blast or charge whereby to heat them and assist in de-gasifying the peas.

The tubular course may be arranged for the conveyance of materials by gravity or by force flow. Preferably, the flow is forced and upward. In this case it is against back pressure in the lower sections, such back pressure being created by the head of the water thereabove. Hence the water in the conduit may be heated to and maintained at a higher temperature than in apparatuses where atmospheric pressure limits the pressure at which the water may be maintained. With an added back pressure of eight pounds, which is easily obtainable in the present apparatus, it is possible to maintain the temperature of the water in the tubular members above two hundred degrees Fahrenheit without impairing the quality of the commodity treated.

Referring now to the drawings in detail, in Figure 1 there is shown an insulating housing 9, enclosing a main conduit composed of a plurality of tubes 10 connected by the return bends 11. Certain of these tubes 10 are provided with steam injectors 12 having connected steam conduits 13 leading to a source of steam under pressure. In addition the pipes 10 are provided roughly at the return bends with valves 14 to shorten the course of the material and these valves are provided with connected auxiliary conduits 15 whereby to vary the effective length of the main conduit and hence the blanching time.

In addition to these sources of live steam and water, a feeding means is provided at the receiving end of the tubes and is diagrammatically designated at 16. The separating and distributing means is designated at 17 at the discharge end of the tubes 10 and 15. The separating and distributing means separates the processed material from the hot water, the material being directed down chute 18 and the hot water in turn being conveyed back to the system through the conduit 19. This water is re-used. It is run through a separating supply tank 20. If desired, a pump 21 may be used to force this water back through the system, and the water and commodity through the pipes 10, the pump taking the water from the tank 20 and from an outside source where the same is desired, and pumping it through the conduits 22 and 10. This tank 20, as shown in Figure 3, may contain a heater 30 possessing temperature controlled means for maintaining a desired water temperature. If desired, a float valve 31 for permitting a fresh supply of water when that in the system is depleted may be provided. An overflow 32 may also be provided to discharge excess water. In addition, baffles 26, 27, 28, and 29 for settling the solid matter out of the liquid may be used and the tank 20 may also have strainers or filters 34 for the water.

I prefer to sprinkle heated water by means of pipe 31 through the distributor or separator 17. The water so sprinkled may replenish the system with water to replace that which is lost by leakage, evaporation, splashing, absorption, and in other ways.

The charging or feeding device shown at 16 may be of any desired construction. It may comprise the washer-elevator illustrated in U. S. Letters Patent No. 1,828,488 to Mead S. Carmichael and dated October 20, 1931, or other charging and feeding devices may be used, such as a pump, for systems, which include the elevation of the material. If I use a charging or feeding device like that illustrated in Patent 1,828,488 the tubes in the washer-elevator may be the same size as the tubes 10. The charging device for the elevating material preferably but not necessarily produces periodic surges of material into the water. For instance, the washer-elevator device in the above mentioned patent produces such surges and is adapted to raise each succeeding charge of the material in the water against any normal back pressure. Hence, a fixed quantity of material, a definite volume of water, and a definite amount of air, as disclosed in said patent, may thus be forced into the tubes 10 in rapid succession, the amount of air being governed by the capacity of the tubes in the washer-elevator and the amount of material in the water being admitted to each tube with each charge. While the peas and the like are introduced into the conduit 10 from the washer-elevator in charges, still due to the back pressure created within the closed conduit 10 these charges are carried along into the flowing water and passed through the conduit 10 in a continuous stream of peas, etc. If desired, additional water may be fed into the hopper 24 in the washer-elevator to be mixed with the material being fed thereinto, such water flowing from tube 25 and its volume being controlled by suitable valve 35. For instance, this additional water is useful in handling commodities which do not flow freely such as cut beans.

In Figure 4 I have disclosed the apparatus used for actuation by gravity, in which any desired hopper 36 for receiving the material to be treated may be used and in this case the hopper has associated therewith means 38 for metering or controlling the flow of material therethrough. A metered flow of material and of hot water will prevent clogging of the material in the tubes.

The separator or distributing means 40 preferably but not necessarily as in the construction of Figures 1 and 2, comprises a rotating screen cage having a plurality of round bars supported on annular members spaced apart and so arranged that the interior of the cylinder is free from projection. The separator and distributor includes a chute 42 for the processed material and a drain emptying the water into a conduit 44 which conveys such water back to the separator and supply tank 46, all being clearly illustrated in Figure 4. In this connection any suitable tank may be used. The type of tank shown in Figure 4 preferably comprises a compartment reservoir for hot water. The water discharged thereinto from the distributor-separator unit 40 is received adjacent one end as at 48. A transverse member or baffle 50 reaches completely across the tank and is provided at its upper end with a portion forming an inverted U-shaped baffle. The tank has three additional main baffles 54, 56, and 58, baffle 56 extending downwardly from the top of the tank and the two others extending upwardly from the bottom thereof. This arrangement of baffles divides the tank into five compartments for quieting the flow of the return water so that all suspended solids are precipitated to the bottom of the tank 46 before the water passes to the last section of tank 46. This last section may contain a heater element 60 which is employed for raising the temperature of the water in such compartment before it is withdrawn therefrom to be forced back again through the tubular system by any suitable means, as for instance, by the pump 62 or other suitable forcing means provided with a driving motor 64 and a control device 68 for varying the speed of the pump and hence the rate of flow of water carrying the commodity while being treated so as to vary or alter the degree or extent of the treatment. Temperature control means 60 is preferably associated with the heater 30 and the tank may include a float valve 65 controlling a water inlet 66 to maintain a substantially fixed volume of water in the system. The baffles, and a strainer or filter 70, if used, are arranged to separate all solid matter from the hot water, and recondition it for re-use.

The separator or distributor 40 preferably is provided with a pipe 72 adapted to feed or discharge heated water over the material to cleanse the same and this hot water may be utilized to replenish the water supply of the apparatus as previously stated. The volume of this spray water may be such that the amount of water sprayed upon the material is sufficient to replace that which is rejected or lost during the operation of the system, it being understood, of course, that the float controlled inlet 66 and an overflow outlet in the tank 46 are utilized to maintain a fixed volume of water in the system.

When this gravity feed and discharge system is employed, the water will be lifted to its highest level by the pump 62 or other means and allowed to run through tubes 10 in a regulated manner. In this construction, the charging means for feeding the material into the system may comprise simply the hopper 36 with means 38 for regulating the flow of said material.

The following description will illustrate clearly how peas are run through the apparatus shown in Figures 1 to 3 and may be used for purposes of generally illustrating the operation of my improved apparatus:

When a washer-elevator is used as a feeding means, peas are fed into the hopper 24 upon the washer-elevator 16. From this hopper the peas pass into revolving cylinders in the washer-elevator from which they are elevated into the tubes 10 by the heated water forced by the pump 21 from the tank 20. The peas pass through the entire length of tubing or where a less number of sections of tubing are to be used for cutting down the time of treatment, through a section thereof as determined by the valve or valves 14 as selected. As the material carried along by the flowing water and peas or other commodity pass through the tubes 10, they will be heated at desired intervals by the steam injectors 12 which inject live steam into the water and into direct contact with the peas. When ejected from the tubes 10 the peas and the hot water tumble into the distributor-separator 17 where clean water is sprayed over the material by the spray 31. If desired, this spray 31 may sprinkle cold water instead of hot water. The peas, after being sprayed with this hot or cold water and separated therefrom, are discharged through the chute 18. The peas are ready to can. The processing has consumed about two minutes or thereabouts. The hot water with the water from the spray 31 mixed therewith flows back to the settling tank 20 by way of conduit 19. In this settling tank such water flows past the several baffles therein, and through the filters or strainers therein, if desired. The water is freed from refuse, split peas, foam, hulls, and other dirt which is separated by mechanical means, which includes the strainers or filters 34 for removing large solid particles. In the fourth compartment of the tank 20, the water is reheated for re-use in the system. The temperature of this water at the time it leaves the fourth compartment of the settling tank is at a relatively high temperature which, if desired, may be near the boiling point. A measured quantity of such water is fed into each cylinder of the washer-elevator with a predetermined quantity of peas falling from hopper 24. Such measured quantity of peas and hot water is lifted by the washer-elevator, surge following surge, and is forced through tubes 10 and bends 11.

The peas in the tubes 10 as they flow therethrough are at all times completely immersed in water. They are bathed constantly over their entire surface and not upon one side as in other types of apparatus. The peas never rest one upon another and are never suspended out of water as in other types of apparatus. The surging action of the water in the tubes is sufficient to cleanse the peas.

The temperature of the water in the blancher system is reduced but slightly during its transit from the feeding means such as the washer-elevator 16 to the separator-distributor unit 17. Such loss in temperature is fully overcome by injecting steam into the tubes at the various points 14 along the course of the tubes 10, which steam directly contacts the peas and water. The housing 9 previously described serves to insulate the tubes against the material loss of heat. Because the hot water is elevated against water and material in the tubes 10 and because of the numerous bends 11 in the tubes 10, the peas and hot water are always moved under a pressure in excess of atmospheric pressure. On a sixteen foot lift, the pressure within the tubing is eight pounds or more above atmospheric. The entire operation thus is during a pressure in excess of that of the atmosphere. Such pressure facilitates the maintenance of a high and constant predetermined temperature for the water. It is possible to maintain a temperature approximating that of boiling water, something which has been impossible in the conventional type of drum blancher. Because of the increased pressure, the complete bathing of the peas, the friction of the tubes and elbows, the higher temperature of the water, the surging action of the water, and the definite apportionment of a volume of peas to a volume of water throughout the entire operation, highly efficient results are obtained. The processing is accomplished in substantially one-tenth the time required in a conventional drum blancher. A blanch of twenty minutes in a conventional blancher may be had in two minutes in the tubes 10. The peas which have been washed and processed by the treatment herein described and in apparatus of the type herein illustrated possess a higher quality than peas of the same grade which have been run through a conventional blancher. In numerous instances, it has been noted that the grade or quality of the peas has been improved because of the uniformity obtained in the cleansing and heating thereof.

Other food commodities are processed in the same manner as peas. For instance, when processing cut beans hot water, however, may be poured upon the beans into the hopper 24 upon the washer-elevator and mixed with the beans before their admission to the tubes in the washer-elevator to facilitate loading. This is desirable because the flat ends on the beans cause them to lodge in the elevator. The same arrangement is necessary in a gravity system for processing cut beans.

It will thus be seen that my improved apparatus offers high sanitation, rapid change of blanching water, water economy, steam economy, uniform blanch, rapid removal of pea gases, conservation of natural color and flavor, automatic temperature control, positive capacity control, mechanical removal of splits and skins, final wash and temperature control, plus space economy. In addition, the present apparatus is highly advantageous inasmuch as I am able to heat treat the commodity as it is being elevated and washed. For instance, the present invention is adaptable for installations where washer-elevators or receiving units are located in one building and the tubing of the washer-elevator carries from this washer-elevator in the first building up and over an area-way between the buildings and possibly the third floor of an adjoining building, then into the adjoining building on the third floor where the tubing is run through the separating unit and from which point the processed commodity can flow automatically by gravity to the final canning apparatus. It will thus be seen that an installation of this type allows us to take advantage of the lifting function of the washer-elevator and wherein the commodity moves upwardly under pressure. It will also be apparent that in the utilization of the washer-elevator type the surging action plus the air in the first section of the tubing or conduit accentuates the washing action.

Many variations in the apparatus may be had without departing from the spirit of the invention which comprises in part the apparatus for enclosing the material in a vessel or long conduit which ensures that each article be at all times completely bathed in water as the water carries the articles therealong immersed therein and with the water maintained at a higher temperature than has heretofore been possible whereby a quicker treatment may be secured whereby a variation in time of the treatment may be expeditiously effected.

In the illustration of the gravity operated system, the pump is, of course, necessary to lift the hot water from a separator-distributor tank to a position contiguous to the hopper in which the material to be processed is fed.

What I claim as new and desire to secure by Letters Patent of the United States is:

1. A system for treating food, comprising means forming a conduit for conveying a mixture of heated liquid and food particles, and means for varying the length of said conduit to vary the period of time that said mixture is confined within said conduit.

2. A system for treating food, comprising means comprising a succession of tubular sections forming a conduit for conveying a mixture of heated liquid and food particles, and means for varying the effective length of said conduit by varying the total number of active sections.

3. A system for treating food, comprising means forming a conduit for conveying a mixture of liquid and food particles, means for continuously admitting substantially constant quantities of the mixture to said conduit, means for heating the mixture at an initial portion of said conduit, and means for effecting variation in the period of subsequent confinement of the mixture within said conduit.

4. A system for treating food, comprising means forming a conduit for conveying a mixture of liquid and food particles, means for continuously admitting substantially constant quantities of the mixture to said conduit, means for heating the mixture at an initial portion of said conduit, and means for varying the effective length of said conduit.

5. In combination, a series of pipes cooperating to form a continuous conduit, means for delivering liquid to said conduit, means for heating an initial portion of said conduit, and a series of by-pass valves for varying the effective length of said conduit beyond said heating means for varying the number of said pipes in said series.

6. An apparatus for heat treating food material substantially in the form of relatively small particles which comprises means forming a closed conduit of considerable length compared with the diameter, means for forcing heated water continuously through said conduit, means for substantially continuously introducing material into said water to be conveyed by the water moving through said conduit, means for injecting steam directly into the conduit at spaced-apart points therealong for the purpose of heating the water and for directly heating the material contained in the water as it flows therealong, and means for separating the material from the water and returning the water to the forcing means.

7. In combination, a series of tubular members forming a conduit, means for heating a portion of said conduit, a pump directly in said conduit in advance of said heating means for delivering a mixture of liquid and peas through said conduit, means for varying the effective length of said conduit beyond said heating means, means for separating the peas from the liquid discharged from said conduit, and means for returning the separated liquid to said pump.

8. An apparatus for treating food materials in granular or relatively small particles which comprises a tubular conduit formed of a plurality of tubes serially arranged, the length of the conduit being a large multiple of its diameter, means at one end of the conduit for admitting material to be processed in hot water through the tubular conduit, means for forcing the hot water through the tubular conduit to convey the material through said tubular conduit, means for supplying additional heat to the water between the ends of the conduit as the water and material pass through said tubular conduit, means for separating material from the water discharged from said tubular conduit, and means for cleansing the water and for returning it to the tubular conduit.

9. An apparatus for heat treating food material in substantially the form of granules which comprises a closed conduit of considerable length compared with the diameter, means for forcing hot water against back pressure continuously through said conduit, means for substantially continuously introducing material into said water at one end of the conduit, means for supplying additional heat to the water at a point along the conduit during passage of the water and material through said conduit, and means receiving the material and water from the conduit for separating the material from the water.

10. In combination, a series of tubular members forming a conduit, means including a pump for delivering a mixture of liquid and food particles to the inlet end of said conduit and forcing it through said conduit, means for supplying heat to the mixture as it flows through the conduit and between the inlet and discharge ends of the conduit, means for separating the food particles from the liquid discharged from said conduit, and means for returning the separated liquid to said pump.

WINFORD E. NICHOLOY.